United States Patent
Kim et al.

(10) Patent No.: US 10,250,367 B2
(45) Date of Patent: Apr. 2, 2019

(54) UPLINK MIMO STBC COMMUNICATION METHOD IN WIRELESS COMMUNICATION SYSTEM AND APPARATUS FOR SAME

(71) Applicant: LG ELECTRONICS INC., Seoul (KR)

(72) Inventors: Youngtae Kim, Seoul (KR); Hanbyul Seo, Seoul (KR); Hyukjin Chae, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/551,508

(22) PCT Filed: Feb. 17, 2016

(86) PCT No.: PCT/KR2016/001606
§ 371 (c)(1),
(2) Date: Aug. 16, 2017

(87) PCT Pub. No.: WO2016/133363
PCT Pub. Date: Aug. 25, 2016

(65) Prior Publication Data
US 2018/0034609 A1 Feb. 1, 2018

Related U.S. Application Data

(60) Provisional application No. 62/116,919, filed on Feb. 17, 2015.

(51) Int. Cl.
*H04L 1/06* (2006.01)
*H04B 7/04* (2017.01)
*H04L 5/00* (2006.01)
*H04B 7/0413* (2017.01)
*H04L 27/26* (2006.01)
(Continued)

(52) U.S. Cl.
CPC .............. *H04L 5/0048* (2013.01); *H04B 7/04* (2013.01); *H04B 7/0413* (2013.01); *H04L 1/06* (2013.01); *H04L 5/0016* (2013.01); *H04L 5/0051* (2013.01); *H04L 27/261* (2013.01); *H04W 72/044* (2013.01); *H04W 72/0413* (2013.01); *H04W 88/02* (2013.01); *H04W 88/08* (2013.01)

(58) Field of Classification Search
CPC ............... H04L 27/261; H04L 5/0048; H04W 72/0413; H04W 72/044; H04W 88/02; H04W 88/08
See application file for complete search history.

(56) References Cited

U.S. PATENT DOCUMENTS 9,374,189 B2 * 6/2016 Wang ...................... H04L 1/00
9,768,929 B2 * 9/2017 Wang ................... H04L 5/0053
(Continued)

FOREIGN PATENT DOCUMENTS

WO 2010058944 A2 5/2010

*Primary Examiner* — Asad M Nawaz
*Assistant Examiner* — Berhanu D Belete
(74) *Attorney, Agent, or Firm* — Dentons US LLP

(57) ABSTRACT

Disclosed is a communication method of a multiple-input and multiple-output (MIMO) space-time block code (STBC) scheme using an uplink resource. In the MIMO STBC scheme of the present disclosure, data is allocated, according to the STBC scheme, to remaining symbols except orthogonal frequency division multiplexing (OFDM) symbols for a reference signal, and the STBC scheme may not be applied to a first OFDM symbol.

10 Claims, 13 Drawing Sheets

(51) Int. Cl.
  *H04W 72/04* (2009.01)
  *H04W 88/02* (2009.01)
  *H04W 88/08* (2009.01)

(56) References Cited

U.S. PATENT DOCUMENTS

| | | | |
|---|---|---|---|
| 2007/0058739 A1* | 3/2007 | Aytur | H03G 3/3068 |
| | | | 375/260 |
| 2010/0158143 A1* | 6/2010 | Wang | H04L 5/0007 |
| | | | 375/260 |
| 2011/0134849 A1 | 6/2011 | Lee et al. | |
| 2011/0189188 A1 | 8/2011 | Kliger et al. | |
| 2011/0200129 A1* | 8/2011 | Hwang | H04L 1/0042 |
| | | | 375/260 |
| 2012/0087427 A1 | 4/2012 | Noh et al. | |
| 2013/0064216 A1* | 3/2013 | Gao | H04W 72/04 |
| | | | 370/330 |
| 2013/0230123 A1 | 9/2013 | Noh et al. | |
| 2014/0286255 A1* | 9/2014 | Nam | H04L 1/1861 |
| | | | 370/329 |
| 2014/0301346 A1* | 10/2014 | Seo | H04L 5/0048 |
| | | | 370/329 |
| 2015/0230211 A1* | 8/2015 | You | H04L 5/0051 |
| | | | 370/330 |
| 2017/0215097 A1* | 7/2017 | Park | H04B 17/318 |
| 2017/0273059 A1* | 9/2017 | You | H04L 25/03 |

\* cited by examiner

UPLINK MIMO STBC COMMUNICATION METHOD IN WIRELESS COMMUNICATION SYSTEM AND APPARATUS FOR SAME This application is a National Stage Application of International Application No. PCT/KR2016/001606, filed on Feb. 17, 2016, which claims the benefit of U.S. Provisional Application No. 62/116,919, filed on Feb. 17, 2015, all of which are hereby incorporated by reference in their entirety for all purposes as if fully set forth herein.

TECHNICAL FIELD

The present invention relates to a wireless communication system, and more particularly, to a method of supporting wireless communication to which an uplink MIMO (Multiple-Input and Multiple-Output) STBC (Space-Time Block Code) technique is applied and an apparatus therefor.

BACKGROUND ART

Recently, as a smartphone and a tablet PC are disseminated and high-capacity multimedia communication is activated, mobile traffic is rapidly increasing. It is expected that an increasing trend of the mobile traffic is going to be doubled in every year in the future. Since most of the mobile traffic is transmitted through an eNB, communication service providers are faced with a serious network load problem. Hence, the communication service providers has increases a network facility to process the increasing traffic and has hurriedly commercialized a next generation mobile communication standard capable of efficiently processing the huge amount of traffic such as WiMAX, LTE (Long Term Evolution), etc. However, in order to handle the traffic amount to be more increased, it is necessary to have a different solution.

In order to solve the aforementioned problem, study on D2D (device-to-device) communication is in progress. The D2D communication corresponds to a distributed communication technique for directly forwarding traffic between adjacent nodes without using such an infrastructure as an eNB. In D2D communication environment, a node (e.g., a mobile terminal, etc.) autonomously searches for a terminal physically adjacent to the node, establishes a communication session, and transmits traffic. In particular, since the D2D communication is able to solve a traffic overload problem by distributing traffic concentrated to an eNB, the D2D communication is getting a spotlight as an element technology of a next generation mobile communication technology after 4G. For this reason, a standard organization such as 3GPP (3rd generation partnership project) or IEEE (Institute of Electrical and Electronics Engineers) is trying to setup a D2D communication standard based on LTE-A (LTE-Advanced) or Wi-Fi.

It is expected that the D2D communication is going to contribute to performance enhancement of a mobile communication system and create a new communication service. And, the D2D communication may support such a service as an adjacency-based social network service or a network game. The D2D communication may solve a connectivity problem of a terminal located at a radio shadow area by utilizing a D2D link as a relay. In particular, it is anticipated that the D2D technology will provide a new service in various fields.

Meanwhile, a device-to-device technology such as infrared communication, ZigBee, RFID (radio frequency identification), NFC (near field communications) based on the RFID, etc. is already widely used. Yet, since the abovementioned technologies support communication of a special purpose only within a very constrained distance (1 m or less), it is difficult to categorize the technologies as a D2D communication technology that distributes traffic of an eNB.

Meanwhile, since a terminal has a limited battery capacity in general, a transmission terminal may transmit a signal with low power. If a signal is transmitted with low power, it may reduce link reliability. As an alternative, MIMO (Multiple-Input and Multiple-Output) technique can be applied to the D2D communication. Yet, a method of performing D2D communication to which the MIMO technique is applied has not been proposed yet.

DISCLOSURE OF THE INVENTION

Technical Tasks

A technical task of the present invention is to provide a method of applying a MIMO STBC technique to communication using uplink and an apparatus therefor.

Another technical task of the present invention is to provide a method of assigning a complex reference signal for uplink MIMO.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

To achieve these and other advantages and in accordance with the purpose of the present invention, as embodied and broadly described, according to one embodiment, a method of transmitting a signal, which is transmitted by a user equipment in a wireless communication system supporting multi-antenna, includes the steps of mapping DMRSs (demodulation reference signals) corresponding to a plurality of antenna ports to first OFDM (Orthogonal Frequency Division Multiplexing) symbols in a subframe, mapping data received from a plurality of the antenna ports to at least a part of the remaining OFDM symbols of the subframe except an OFDM symbol having a lowest OFDM symbol index and the first OFDM symbols according to an STBC (Space-Time Block Code) scheme, and transmitting the subframe using a resource allocated to uplink.

Preferably, a predetermined signal can be mapped to the OFDM symbol having the lowest OFDM symbol index.

Preferably, a plurality of the antenna ports include a first antenna port and a second antenna port and the step of mapping the data received from a plurality of the antenna ports can include the step of alternately mapping data received from the first antenna port and data received from the second antenna port to the remaining OFDM symbols of the subframe except the first OFDM symbols.

Preferably, if an extended cyclic prefix is used, the first OFDM symbols can include OFDM symbols of an OFDM symbol index 3 and an OFDM symbol index 8.

Preferably, the first OFDM symbols can include at least an OFDM symbol having the lowest OFDM symbol index.

Preferably, a data received from each of a plurality of the antenna ports can be sequentially mapped to the OFDM symbol having the lowest OFDM symbol index according to a subcarrier.

To further achieve these and other advantages and in accordance with the purpose of the present invention, according to a different embodiment, a method of receiving a signal, which is received by a user equipment in a wireless communication system supporting multi-antenna, includes the steps of receiving a subframe using a resource allocated to uplink, and performing AGC (Automatic Gain Control) using an OFDM symbol having a lowest OFDM (Orthogonal Frequency Division Multiplexing) symbol index in the subframe. In this case, DMRSs (demodulation reference signals) corresponding to a plurality of antenna ports are mapped to first OFDM symbols of the subframe and data received from a plurality of the antenna ports can be mapped to at least a part of the remaining OFDM symbols of the subframe except the OFDM symbol having the lowest OFDM symbol index and the first OFDM symbols according to an STBC (Space-Time Block Code) scheme.

Advantageous Effects

According to embodiments of the present invention, it is able to obtain diversity by applying MIMO to uplink.

According to embodiments of the present invention, it is able to more efficiently perform AGC (Automatic Gain Control).

According to embodiments of the present invention, it is able to improve reception capability of a receiving end.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure, illustrate embodiments of the disclosure and together with the description serve to explain the principle of the disclosure. In the drawings.

BEST MODE

Mode for Invention

Figure 1:
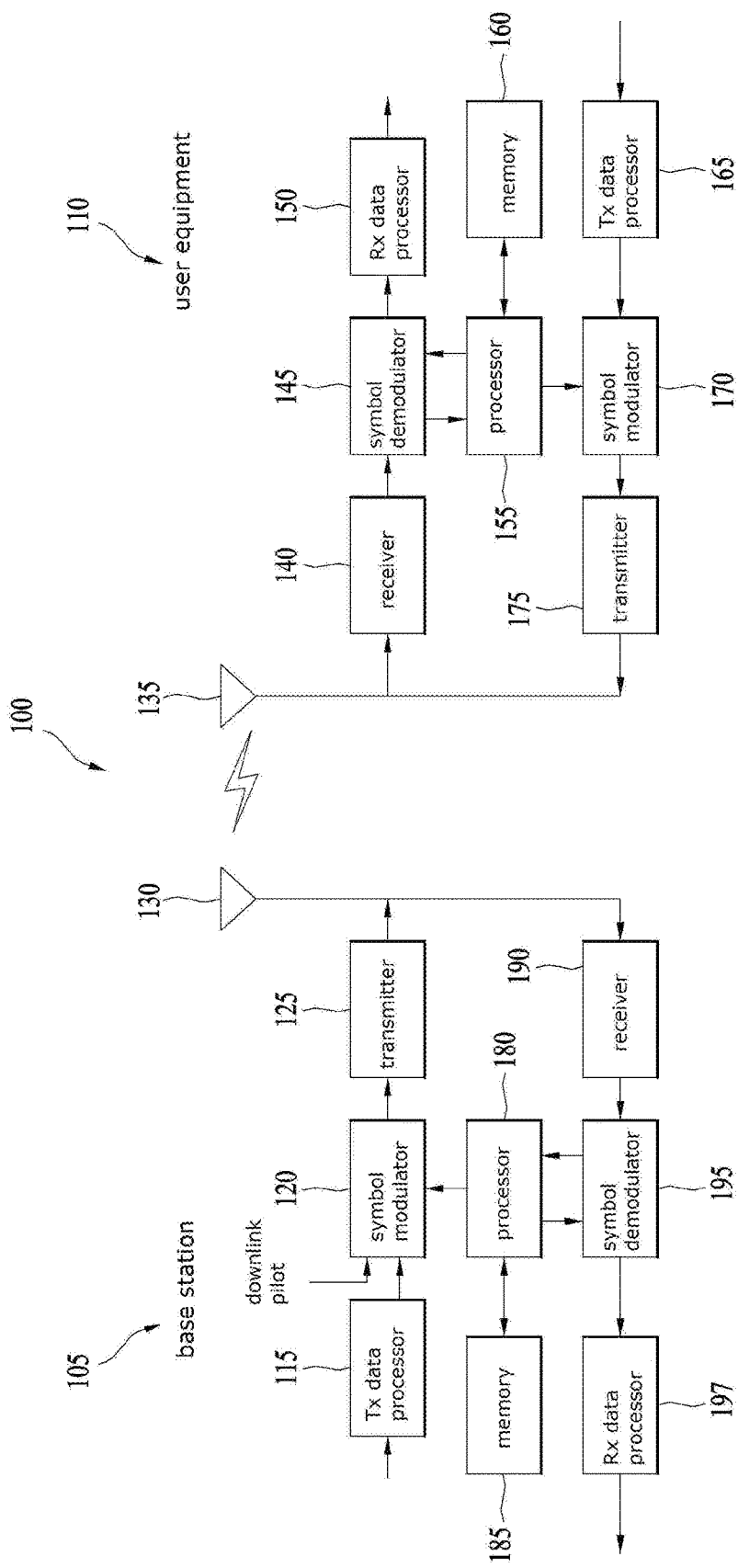
FIG. 1 is a block diagram of configurations of an eNB and a UE in a wireless communication system.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS.

The term 'BS' may be replaced with a fixed station, a Node B, an evolved Node B (eNode B or eNB), an Advanced Base Station (ABS), an access point, etc. In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

In the following description, specific terminologies are provided to help the understanding of the present invention. And, the use of the specific terminology can be modified into another form within the scope of the technical idea of the present invention.

Occasionally, to prevent the present invention from getting vaguer, structures and/or devices known to the public are skipped or can be represented as block diagrams centering on the core functions of the structures and/or devices.

The embodiments of the present disclosure may be supported by standard specifications disclosed for at least one of wireless access systems including an IEEE 802 system, a 3GPP system, a 3GPP LTE system, and a 3GPP2 system. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

The embodiments of the present invention are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE. WiMAX can be explained by IEEE 802.16e standard (WirelessMAN-OFDMA Reference System) and evolved IEEE 802.16m standard (WirelessMAN-OFDMA Advanced system). For clarity, 3GPP LTE and 3GPP LTE-A are mainly explained in the following. However, the technical idea of the present invention may be non-limited by 3GPP LTE and 3GPP LTE-A.

Moreover, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol de-mapping, de-interleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into $1^{st}$ layer (L1), $2^{nd}$ layer (L2) and $3^{rd}$ layer (L3) based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

LTE/LTE-A Resource Structure/Channel

A structure of a downlink radio frame is explained with reference to FIGS. 2a and 2b.

In a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD). In particular, FIG. 2a shows a frame structure for FDD (Frequency Division Duplex) used in 3GPP LTE/LTE-A system and FIG. 2b shows a frame structure for TDD (Time Division Duplex) used in 3GPP LTE/LTE-A system.

Figure 2A:
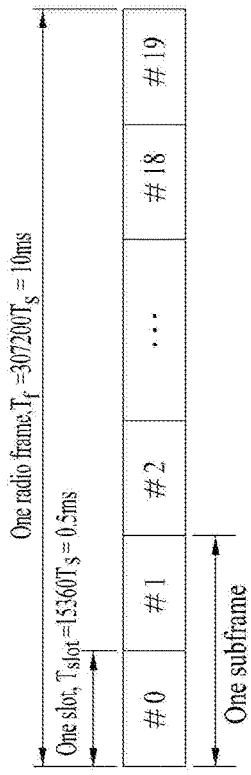
FIGS. 2a and 2b are diagrams for a structure of a downlink radio frame.

FIG. 2a is a diagram illustrating a structure of a type 1 radio frame. A radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15\ kHz \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. In a radio frame, 20 slots can be sequentially numbered from 1 to 19. One slot may have a length of 0.5 ms. Time necessary for transmitting one subframe is defined as a TTI (transmission time interval). A time resource is identified by a radio frame number (or, a radio frame index), a subframe number (or, a subframe index), a slot number (or, a slot index), and the like.

Figure 2B:
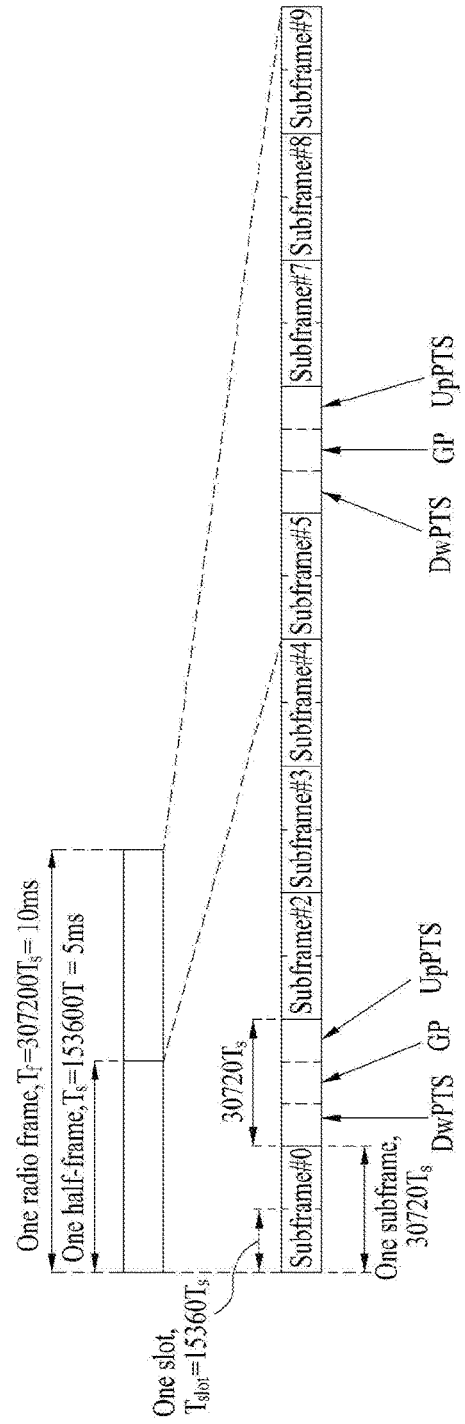

FIG. 2b is a diagram illustrating a structure of a type 2 radio frame. The type 2 radio frame includes two half frames, each of which includes 5 subframes, a downlink pilot time slot (DwPTS), a guard period (GP), and an uplink pilot time slot (UpPTS). In this case, one subframe includes 2 slots. The DwPTS is used for initial cell search, synchronization or channel estimation at the user equipment. The UpPTS is used for channel estimation at the base station and uplink transmission synchronization of the user equipment. The guard period corresponds to a period for removing interference occurred in the uplink due to multipath delay of downlink signals between the uplink and the downlink. Meanwhile, one subframe consists of 2 slots irrespective of a type of a radio frame.

A radio frame can be differently configured according to a duplex mode. For example, since DL transmission is distinguished from UL transmission based on a frequency in FDD (Frequency Division Duplex) mode, a radio frame includes either a DL subframe or a UL subframe for a specific frequency band. Since DL transmission is distinguished from UL transmission based on time in TDD mode, a radio frame includes both a DL subframe and a UL subframe for a specific frequency band.

UL/DL configuration of subframes in a radio frame in TDD mode is illustrated in Table 1 below.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the Table 1, D means the downlink subframe, U means the uplink subframe, and S means the special subframe. The special subframe includes 3 fields including DwPTS (Downlink Pilot TimeSlot), GP (Guard Period), and UpPTS (Uplink Pilot TimeSlot). The DwPTS corresponds to a time period reserved for DL transmission and the UpPTS corresponds to a time period reserved for UL transmission. Table 2 in the following shows a configuration of a special subframe.

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the aforementioned radio frame is only exemplary, and various modifications may be made in the number of subframes included in the radio frame, the number of slots included in the subframe, or the number of symbols included in the slot.

Figure 3:
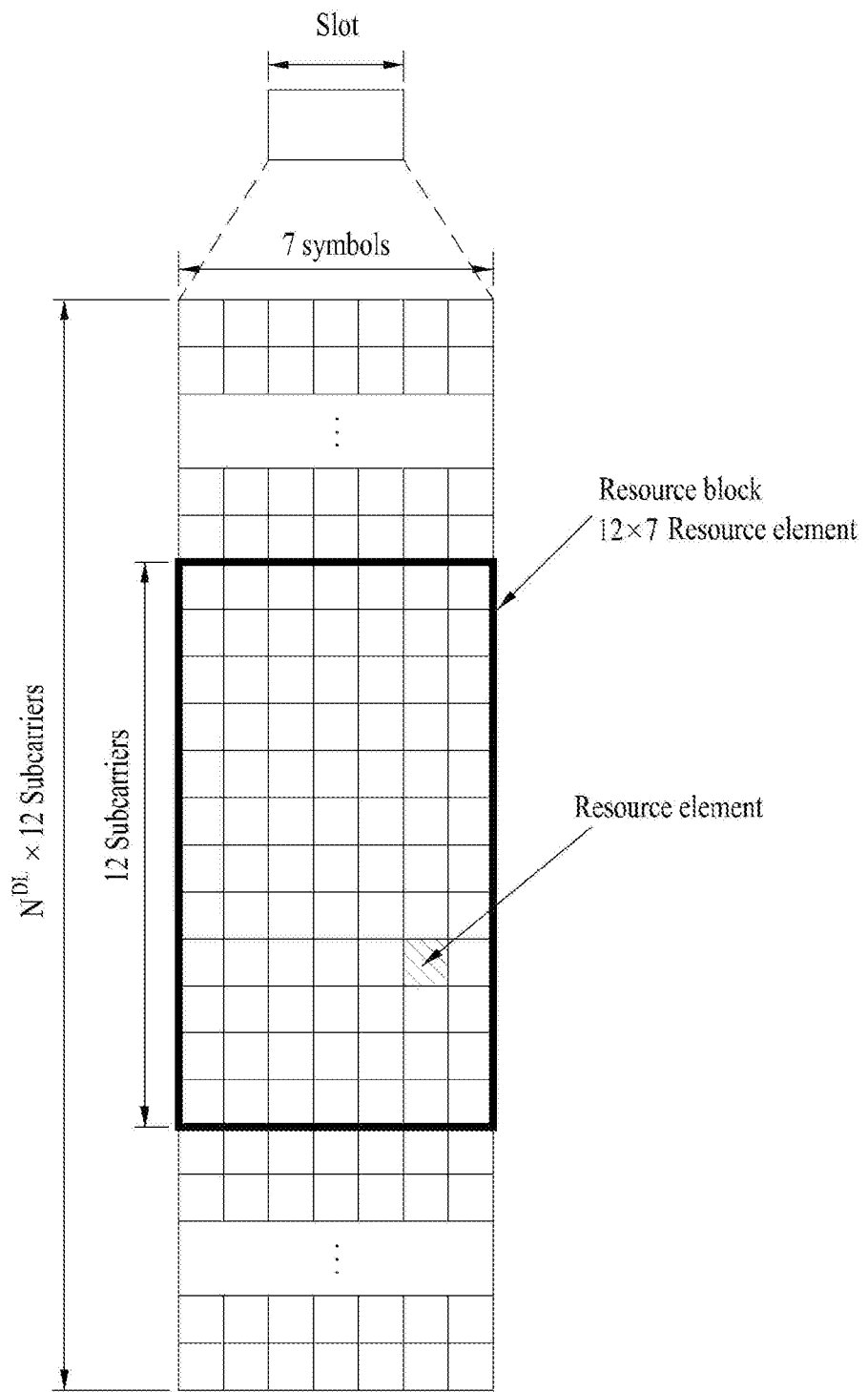
FIG. 3 is a view illustrating an exemplary resource grid for the duration of a downlink slot.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited. For example, in case of a normal CP (cyclic prefix), one slot includes 7 OFDM symbols. In case of an extended CP, one slot includes 6 OFDM symbols. Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
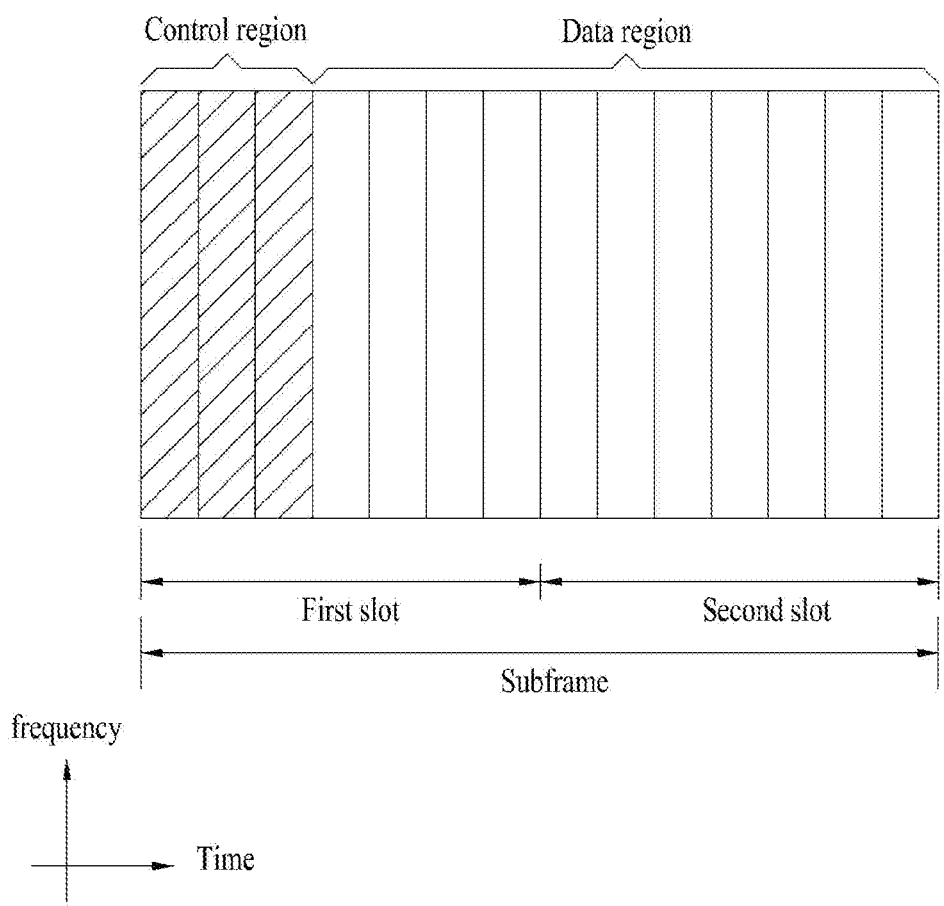
FIG. 4 is a view illustrating an exemplary structure of an uplink subframe.

FIG. 4 is a view illustrating the structure of a DL subframe. Up to three first OFDM symbols of the first slot of one subframe correspond to a control region to which control channels are allocated. The remaining OFDM symbols correspond to a data region to which a Physical Downlink Shared Channel (PDSCH) is allocated. Examples of DL control channels in the 3GPP LTE system include Physical Control Format Indicator Channel (PCFICH), Physical Downlink Control Channel (PDCCH), Physical hybrid automatic repeat request indicator Channel (PHICH), and so on. The PCFICH is transmitted in the first OFDM symbol of a subframe, carrying information about the number of OFDM symbols used for transmission of control channels in the subframe. The PHICH is a response channel for a UL transmission, including an Acknowledgment/Negative Acknowledgment (ACK/NACK) signal. The PDCCH delivers Downlink Control Information (DCI). The DCI includes UL or DL scheduling information or a UL transmit power control command for any UE group. The PDCCH carries a transmission format and resource allocation information for a Downlink Shared Channel (DL-SCH), a transmission format and resource allocation information for an Uplink Shared Channel (UL-SCH), paging information on a Paging Channel (PCH), system information on the DL-SCH, resource allocation information of a higher-layer control message such as a random access response transmitted on the PDSCH, a transmit power control command set for individual UEs in a UE group, transmission power control information, activation information for Voice over Internet Protocol (VoIP), and so on. A plurality of PDCCHs may be transmitted in the control region. A UE may monitor a plurality of PDCCHs. The PDCCH is transmitted in an aggregate of one or more contiguous Control Channel Elements (CCEs). A CCE is a logical allocation unit used to provide a PDCCH at a coding rate based on a radio channel state. The CCE corresponds to a plurality of Resource Element Groups (REGs). A PDCCH format and the number of available bits are determined according to the correlation between the number of CCEs and a coding rate provided by the CCEs. A BS determines a PDCCH format according to DCI to be transmitted to a UE, and attaches a Cyclic Redundancy Check (CRC) to control information. The CRC is masked by an Identifier (ID) (e.g. Radio Network Temporary Identifier (RNTI)) according to the owner or usage of the PDCCH. For example, if the PDCCH is directed to a specific UE, the CRC may be masked by a cell-RNTI (C-RNTI) of the UE. If the PDCCH is for a paging message, the CRC may be masked by a paging indicator identifier (P-RNTI). If the PDCCH is for system information (more specifically, a System Information Block (SIB)), the CRC may be masked by a System Information RNTI (SI-RNTI). If the PDCCH is for a random access response transmitted in response to a random access preamble, the CRC may be masked by a Random Access RNTI (RA-RNTI).

Figure 5:
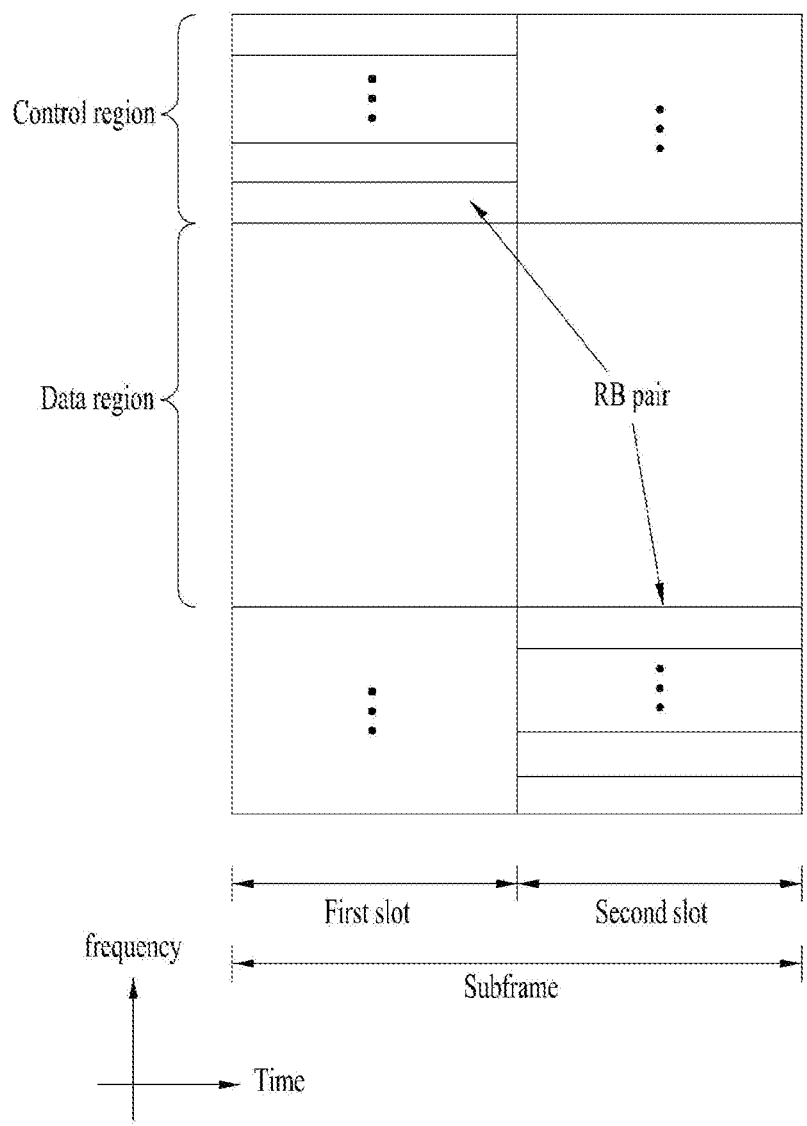
FIG. 5 is a view illustrating an exemplary structure of a downlink subframe.

FIG. 5 illustrates a structure of a UL subframe which may be used in embodiments of the present disclosure. Referring to FIG. 5, a UL subframe may be divided into a control region and a data region in the frequency domain A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Multiple Antenna System

According to a multiple antenna technology, reception of a message does not depend on a single antenna path. Instead, data fragments received through multiple antennas are collected and combined to complete data. If the multiple antenna technology is used, it may improve a data transfer rate within a specific range or increase system coverage for a specific data transmission speed. Hence, this technology corresponds to a next generation mobile communication technology capable of being widely used by a mobile communication terminal, a relay, etc. The MIMO technology is getting a spotlight as a next generation technology capable of overcoming a limit of transmission amount of mobile communication that faces a critical situation due to data communication expansion, and the like.

Figure 6A:
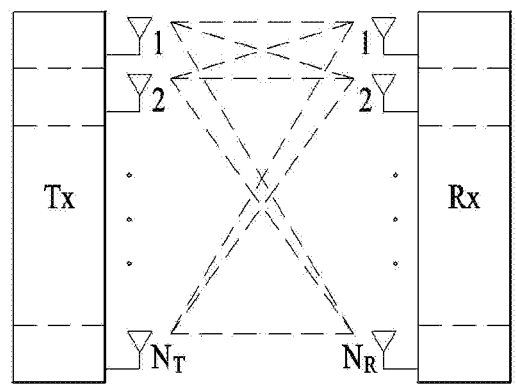
FIGS. 6a and 6b are diagrams for a configuration of a general MIMO communication system.

Referring to FIG. 6(a), when the number of Transmission (Tx) antennas and the number of Reception (Rx) antennas are increased to $N_T$ and $N_R$, respectively at both a transmitter and a receiver, a theoretical channel transmission capacity increases in proportion to the number of antennas, compared to the use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate $R_o$ that may be achieved with a single antenna and a rate increase rate $R_i$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO wireless communication system was verified in the middle 1990s, many techniques have been actively developed to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

A communication method in a MIMO system will be described in greater detail, using mathematical modeling. It is assumed that there are $N_T$ Tx antennas and $N_R$ Rx antennas in the system. Regarding a transmission signal, up to $N_T$ pieces of information can be transmitted through the $N_T$ Tx antennas, as expressed as the following equation.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

$N_T$ transmission signals $x_1, x_2, \ldots, x_{N_T}$ may be generated by multiplying the transmission power-controlled information vectors $\hat{s}$ by a weight matrix W. The weight matrix W functions to appropriately distribute the transmission information to the Tx antennas according to transmission channel states, etc. These $N_T$ transmission signals $x_1, s_2, \ldots, x_{N_T}$ are represented as a vector x, which may be determined by $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \qquad \text{[Equation 5]}$$

$$= W\hat{s} = WPs$$

Here, $w_{ij}$ denotes a weight between a $j^{th}$ piece of information and an $i^{th}$ Tx antenna. W is also called a weight matrix or a precoding matrix.

Given $N_R$ Rx antennas, signals received at the Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO wireless communication system, they may be distinguished according to the indexes of Tx and Rx antennas. A channel between a $j^{th}$ Tx antenna and an $i^{th}$ Rx antenna is denoted by $h_{ij}$. One thing to note herein is that the index of an Rx antenna precedes the index of a Tx antenna in $h_{ij}$.

Figure 6B:
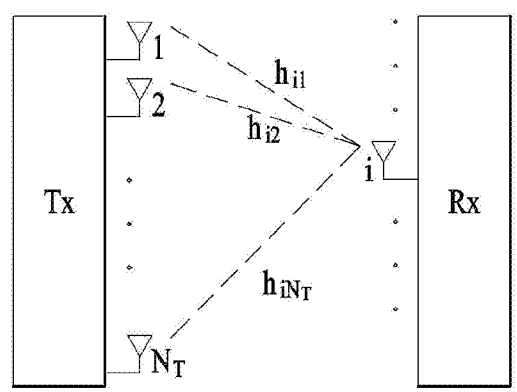

FIG. 6(b) illustrates channels from $N_T$ Tx antennas to an $i^{th}$ Rx antenna. The channels may be collectively represented as a vector or a matrix.

Referring to FIG. 6(b), the channels from the $N_T$ Tx antennas to the $i^{th}$ Rx antenna may be expressed as [Equation 7].

$$h_i^T = [h_{i1}, h_{i2}, \ldots, h_{iN_T}] \qquad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \qquad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \qquad \text{[Equation 9]}$$

From the above mathematical modeling, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \qquad \text{[Equation 10]}$$

-continued $$\begin{bmatrix} n_1 \\ n_2 \\ \vdots \\ n_i \\ \vdots \\ n_{N_R} \end{bmatrix}$$

$$= Hx + n$$

The numbers of rows and columns in the channel matrix H representing channel states are determined according to the numbers of Rx and Tx antennas. Specifically, the number of rows in the channel matrix H is equal to the number of Rx antennas, $N_R$ and the number of columns in the channel matrix H is equal to the number of Tx antennas, $N_T$. Hence, the channel matrix H is an $N_R \times N_T$ matrix. The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \quad \text{[Equation 11]}$$

MIMO transmission and reception schemes used for operating the MIMO system may include FSTD (frequency switched transmit diversity), SFBC (Space Frequency Block Code), STBC (Space Time Block Code), CDD (Cyclic Delay Diversity), TSTD (time switched transmit diversity) and the like. In a rank 2 or higher, SM (Spatial Multiplexing), GCDD (Generalized Cyclic Delay Diversity), S-VAP (Selective Virtual Antenna Permutation) and the like can be used.

The FSTD corresponds to a scheme of obtaining a diversity gain by assigning a subcarrier of a different frequency to a signal transmitted by each of multiple antennas. The SFBC corresponds to a scheme capable of securing both a diversity gain in a corresponding dimension and a multi-user scheduling gain by efficiently applying selectivity in a spatial domain and a frequency domain. The STBC corresponds to a scheme of applying selectivity in a spatial domain and a time domain. The CDD corresponds to a scheme of obtaining a diversity gain using path delay between Tx antennas. The TSTD corresponds to a scheme of distinguishing signals transmitted by multiple antennas from each other on the basis of time. The spatial multiplexing (SM) corresponds to a scheme of increasing a transfer rate by transmitting a different data according to an antenna. The GCDD corresponds to a scheme of applying selectivity in a time domain and a frequency domain. The S-VAP corresponds to a scheme of using a single precoding matrix. The S-VAP can be classified into an MCW (multi codeword) S-VAP for mixing multiple codewords between antennas in spatial diversity or spatial multiplexing and an SCW (single codeword) S-VAP for using a single codeword RSRP: Reference Signal Received Power RSRP is defined by a linear average of power of a resource element that carries a cell-specific reference signal (CRS) in a measured frequency bandwidth. A UE detects a cell-specific reference signal (CRS), which is transmitted in a manner of being mapped to a specific resource element, to determine the RSRP. In calculating the RSRP, a cell-specific reference signal (R0) for an antenna port 0 can be basically used. If a UE is able to reliably detect a cell-specific reference signal (R1) for an antenna port 1, the UE can determine the RSRP using the R1 in addition to the R0. For details of the cell-specific reference signal, it may refer to a standard document (e.g., 3GPP TS36.211).

LTE Carrier RSSI: Received Signal Strength Indicator

RSSI can be defined by total received wideband power received from all sources including a common-channel serving cell, a non-serving cell, adjacent channel interference, thermal noise, and the like in a measurement band measured by a UE. The RSSI can be used as an input for RSRQ (Reference Signal Received Quality) described in the following.

RSRQ: Reference Signal Received Quality

RSRQ provides a cell-specific signal quality property. The RSRQ is similar to the RSRP. Yet, the RSRQ can be mainly used for prioritizing LTE candidate cells different from each other according to signal quality of each cell. For example, if RSRP measurement provides information insufficient for determining stable mobility, an RSRQ measurement value can be used as an input for determining handover and cell reselection. The RSRQ is defined by a value resulted from dividing the number of resource blocks within a frequency bandwidth used for measuring the RSRP by LTE carrier RSSI (i.e., RSRQ=N×RSRP/(E-UTRA carrier RSSI)). Numerator (N×RSRP) and denominator (E-UTRA carrier RSSI) are measured for the same resource block set. The RSRP corresponds to an indicator of preferred signal strength, whereas the RSRQ may be able to report a combined effect between signal strength and interference using an efficient method in consideration of an interference level included in the RSSI.

RS: Reference Signal

When a packet is transmitted in a mobile communication system, since the packet is transmitted via a radio channel, a signal may be distorted in the course of transmission. In order for a receiving end to correctly receive the distorted signal, the receiving end may correct the distortion of the transmitted signal as much as channel information by finding out the channel information. In order to find out the channel information, a signal known to both a transmitting end and the receiving end is transmitted and it may find out the channel information with the extent of distortion of the signal when the signal is received on a channel. The signal known to both the transmitting end and the receiving end is called a pilot signal or a reference signal. When wireless communication to which MIMO technique is applied is performed, a separate reference signal exists in each transmission antenna.

In a mobile communication system, a reference signal (RS) is mainly classified into two types according to a usage of the reference signal. The reference signal includes a reference signal used for obtaining channel information and a reference signal used for data demodulation. Since the former one is used for a UE to obtain the channel information in downlink, it is necessary for the RS to be transmitted by a wide band. Although a UE does not receive downlink data in a specific subframe, the UE should be able to receive and measure the RS. The RS used for obtaining the channel information can also be used for measuring handover and the like. The latter one corresponds to an RS transmitted to a corresponding resource together with a downlink resource when a base station transmits the downlink data. A UE can perform channel estimation by receiving the RS and may be then able to demodulate data. The reference signal used for data demodulation is transmitted in a region in which data is transmitted.

LTE system defines a downlink RS of two types for a unicast service. An RS is classified into a common RS (CRS)

used for obtaining information on a channel state and measuring handover and the like and a UE-specific RS used for demodulating data. In LTE system, the UE-specific RS is used for modulating data only. On the contrary, the CRS is used not only for obtaining channel information but also for demodulating data. The CRS corresponds to a cell-specific signal and is transmitted in every subframe over a wide band.

In LTE-A system, a reference signal capable of supporting maximum 8 transmitting antennas is required. In order to support 8 transmitting antennas while backward compatibility with LTE system is maintained, it is necessary to additionally define RSs for maximum 8 transmission antennas in time-frequency domain in which a CRS defined in LTE is transmitted in every subframe over a whole band. If the RSs for the maximum 8 transmission antennas are added in LTE-A system using a scheme identical to the CRS of a legacy LTE, RS overhead becomes considerably big. Hence, an RS is newly designed in LTE-A to measure a channel for selecting MCS (Modulation and Coding Scheme), PMI (Precoding Matrix Indicator), and the like. The RS is mainly classified into two types including an RS (CSI-RS: channel state information-RS) and an RS (DM-RS) used for demodulating data. Unlike a legacy CRS, which is used for measuring a channel, handover and the like and demodulating data, the CSI-RS is mainly designed for the purpose of obtaining information on a channel Since the CSI-RS is mainly transmitted to obtain information on a channel state, it is not necessary to transmit the CSI-RS in every subframe. In order to reduce overhead due to the CSI-RS, the CSI-RS is intermittently transmitted in time domain. For data demodulation, a DM-RS for a corresponding UE is transmitted. In particular, a DM-RS of a specific UE is transmitted in a region in which the specific UE is scheduled only, i.e., a time-frequency domain in which data is received by the specific UE.

Figure 7:
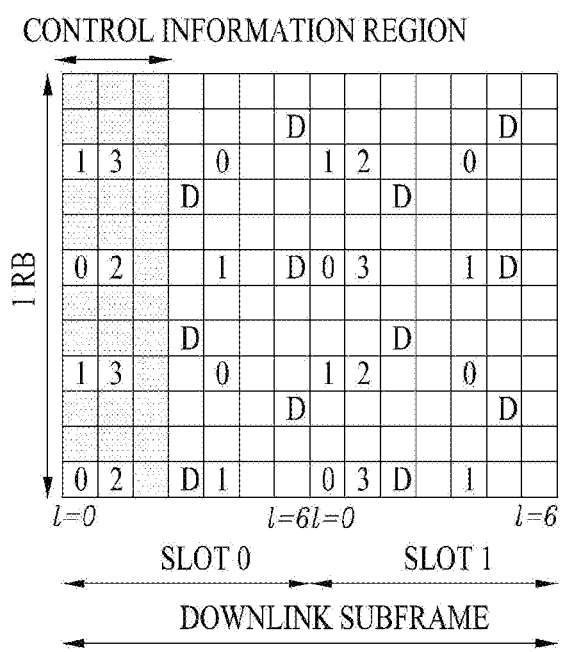
FIG. 7 is a diagram for a configuration of a downlink reference signal for a normal CP in LTE system supporting downlink transmission using 4 antennas.
Figure 8:
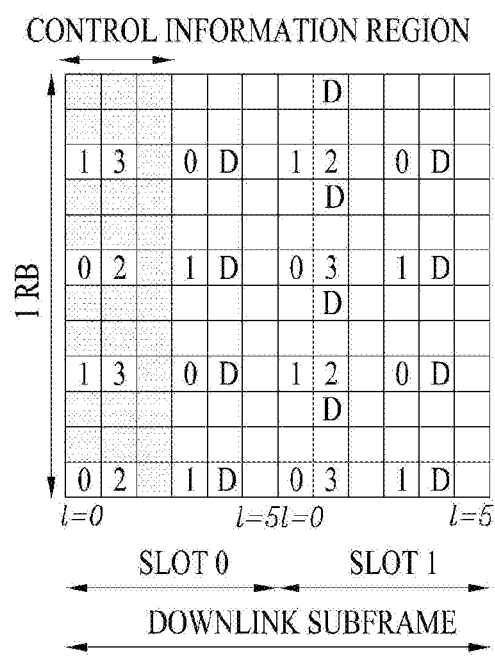
FIG. 8 is a diagram for a configuration of a downlink reference signal for an extended CP in LTE system supporting downlink transmission using 4 antennas.
Figure 9:
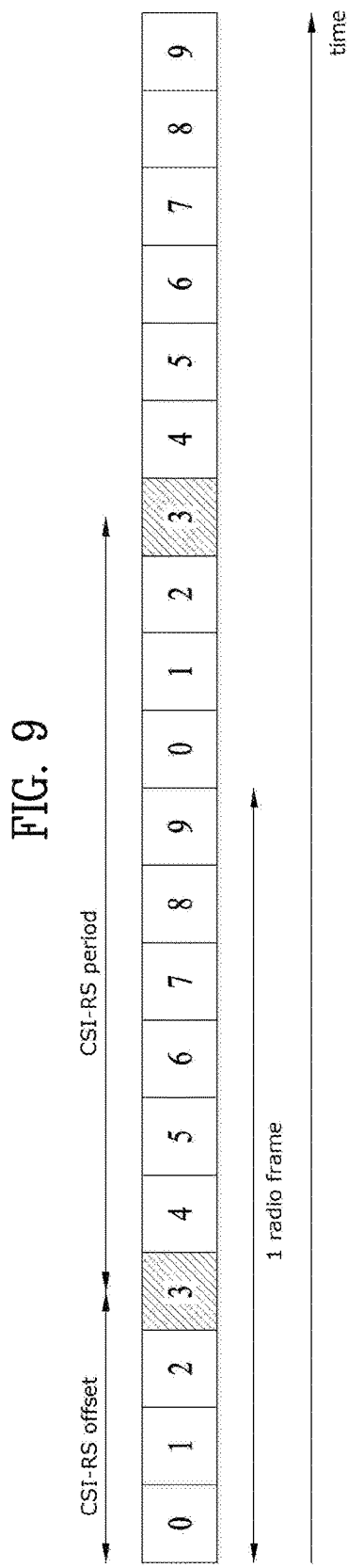
FIG. 9 is a diagram for an example of a periodic CSI-RS transmission scheme.

FIGS. 7 and 8 illustrate RS configurations in an LTE system supporting DL transmission through four antennas (4-Tx DL transmission). Specifically, FIG. 8 illustrates an RS configuration in the case of a normal CP and FIG. 9 illustrates an RS configuration in the case of an extended CP.

Referring to FIGS. 7 and 8, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 7 and 8, the DMRSs are transmitted through antenna port 5. 3GPP TS 36.211 defines DMRSs for a total of eight antenna ports, antenna port 7 to antenna port 14.

For example, a rule of mapping an RS mapped to a resource block may follow following equations.

In case of a CRS, the CRS can be mapped according to equation 12.

$$k = 6m + (v + v_{shift}) \bmod 6 \quad \text{[Equation 12]}$$

$$l = \begin{cases} 0, N_{symb}^{DL} & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In case of a DRS (dedicated RS), the DRS can be mapped according to equation 13.

normal CP [Equation 13]

$$k = (k') \bmod N_{SC}^{RB} + N_{SC}^{RB} * n_{PRB}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

Extended CP $$k = (k') \bmod N_{SC}^{RB} + N_{SC}^{RB} * n_{PRB}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In equations 12 and 13, k indicates a subcarrier index and P indicates an antenna port index. And, $N_{DL}^{RB}$ indicates the number of resource blocks allocated to DL, $n_s$ indicates a slot index, and $N_{ID}^{cell}$ indicates a cell ID.

In LTE-A system, an eNB transmits a CSI-RS to all antenna ports. As mentioned in the foregoing description, a CSI-RS can be intermittently transmitted in a time axis. In particular, a CSI-RS can be periodically transmitted with an interval of integer multiple of a subframe. Or, a CSI-RS can be transmitted with a specific transmission pattern. In this case, the interval or the pattern used for transmitting a CSI-RS can be configured by an eNB. In order to measure a channel using a CSI-RS, a UE should be aware of such information as a transmission subframe index of the CSI-RS for each CSI-RS antenna port of a cell to which the UE belongs, a CSI-RS RE time-frequency position within a transmission subframe, a CSI-RS sequence, and the like.

In LTE-A system, a resource used for transmitting a CSI-RS to antenna ports different from each other should be orthogonal to each other. When an eNB transmits a CSI-RS to antenna ports different from each other, resources can be orthogonally allocated using FDM/TDM scheme in a manner of mapping a CSI-RS transmitted to each antenna port to REs different from each other. Or, a CSI-RS transmitted to antenna ports different from each other can be mapped to codes orthogonal to each other using a CDM scheme.

An example of a scheme periodically transmitting a CSI-RS is shown in FIG. 9. As shown in FIG. 9, a CSI-RS is transmitted with a period of 10 ms and a CSI-RS transmission offset corresponds to 3. An offset value may vary according to an eNB to enable CSI-RSs of many cells to be evenly distributed. In case of a CSI-RS transmitted with a period of 10 ms, an eNB may have 10 offset values ranging from 0 to 9. The offset value indicates a subframe index value where the eNB of a specific period actually starts to transmit a CSI-RS. If the eNB informs a UE of a period of a CSI-RS and an offset value, the UE measures the CSI-RS of the eNB at a corresponding position using the value and reports such information as CQI/PMI/RI and the like to the eNB. All of the aforementioned informations related to the CSI-RS correspond to cell-specific information.

Figure 10:
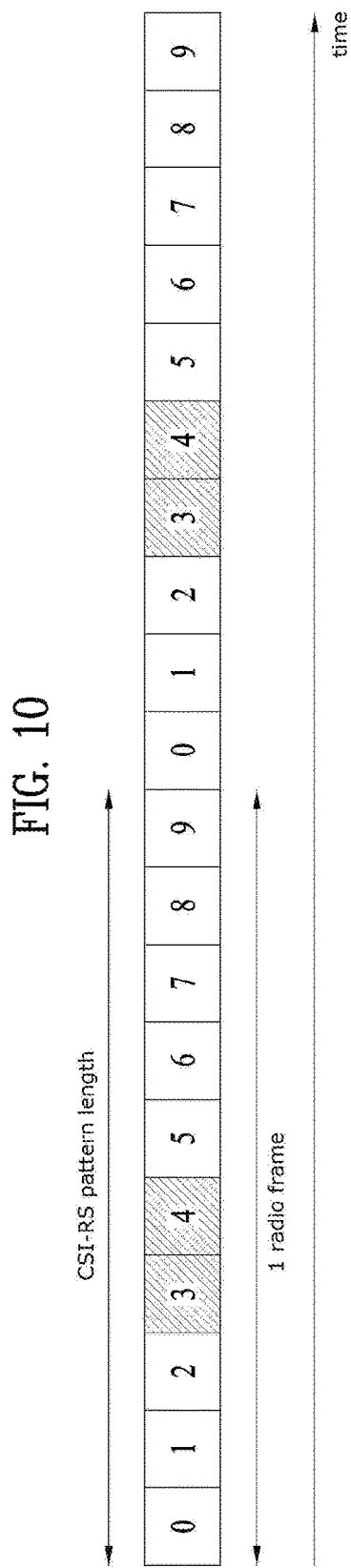
FIG. 10 is a diagram for an example of an aperiodic CSI-RS transmission scheme.

FIG. 10 shows an example of an aperiodic CSI-RS transmission scheme. Referring to FIG. 10, an eNB transmits a CSI-RS at subframe indexes 3 and 4. A transmission pattern includes 10 subframes. In each subframe, whether to transmit a CSI-RS can be designated by a bit indicator.

In general, an eNB is able to inform a UE of CSI-RS configuration by one of two schemes described in the following.

First of all, an eNB can transmit CSI-RS configuration using DBCH (dynamic broadcast channel) signaling that the eNB broadcasts information on CSI-RS configuration to UEs. In LTE system, when contents on system information are informed to UEs, the information is transmitted to the UEs via a BCH (broadcasting channel). Yet, if the contents are too much and the BCH is unable to carry all of the contents, the contents are transmitted using a scheme used for transmitting a general data. And, PDCCH of corresponding data is transmitted in a manner of being CRC-masked using SI-RNTI, i.e., system information RNTI instead of a specific UE ID. And, actual system information is transmitted in a PDSCH region together with a general unicast data. By doing so, all UEs in a cell decode PDCCH using the SI-RNTI, decode PDSCH indicated by the corresponding PDCCH and may be then able to obtain system information. This sort of broadcasting scheme may be called a DBCH (dynamic BCH) to differentiate from a general broadcasting scheme, i.e., PBCH (physical BCH). System information broadcasted in LTE system can be divided into two types. One is a master information block (MIB) transmitted on the PBCH and another one is a system information block (SIB) transmitted on PDSCH and then transmitted in a manner of being multiplexed with a general unicast data. It may be able to transmit VSI-RS configuration using SIB9, SIB10, or the like newly introduced in LTE-A.

An eNB can inform each UE of information on CSI-RS configuration using RRC (radio resource control) signaling. In the course of establishing a connection with the eNB via an initial access or handover of the UE, the eNB informs the UE of the CSI-RS configuration via RRC signaling. Or, an eNB may inform a UE of CSI-RS configuration via an RRC signaling message, which requires feedback based on CSI-RS measurement.

In the following, various embodiments for a UE to perform device to device communication (hereinafter, D2D communication, D2D direct communication, etc.) are explained. In explaining the D2D communication, 3GPP LTE/LTE-A is mainly explained as an example. Yet, the D2D communication can also be applied to a different communication system (e.g., IEEE 802.16, WiMAX, etc.).

D2D Communication Type

D2D communication can be classified into a network coordinated D2D communication type and an autonomous D2D communication type according to whether a D2D communication is performed by a control of a network. The network coordinated D2D communication type can be classified again into a type of transmitting data only by D2D (data only in D2D) and a type of performing an access control only by a network (connection control only in network) according to the extent of involvement of the network. For clarity, the type of transmitting data only by the D2D is called a 'network concentrated D2D communication type' and the type of performing access control only by the network is called a 'distributed D2D communication type' in the following.

According to the network concentrated D2D communication type, data is exchanged between D2D terminals only. An access control (connection control) and radio resource allocation (grant message) between the D2D terminals are performed by a network. The D2D terminals can transmit and receive data or specific control information using a radio resource allocated by the network. For instance, HARQ ACK/NACK feedback for the data reception between the D2D terminals or channel state information (CSI) is not directly exchanged between the D2D terminals. Instead, the feedback or the CSI can be transmitted to a different D2D terminal via the network. Specifically, when the network establishes a D2D link between the D2D terminals and allocates a radio resource to the established D2D link, a transmission D2D terminal and a reception D2D terminal can perform D2D communication using the allocated radio resource. In particular, according to the network concentrated D2D communication type, D2D communication between D2D terminals is controlled by the network and the D2D terminals can perform D2D communication using a radio resource allocated by the network.

A network according to the distributed D2D communication type performs a more limitative role compared to a network according to the network concentrated D2D communication type. Although the network in the distributed D2D communication type performs an access control between D2D terminals, radio resource allocation (grant message) between the D2D terminals can be autonomously occupied by the D2D terminals via contention without a help of the network. For instance, HARQ ACK/NACK feedback for the reception of data between the D2D terminals or channel state information can be directly exchanged between the D2D terminals without passing through the network.

As mentioned earlier in the foregoing example, D2D communication can be classified into the network concentrated D2D communication type and the distributed D2D communication type according to the extent of involvement of a network. In this case, a common characteristic between the network concentrated D2D communication type and the distributed D2D communication type is a D2D access control capable of being performed by the network.

Specifically, a network according to the network coordinated D2D communication type can establish a connection between D2D terminals in a manner of establishing a D2D link between the D2D terminals intending to perform D2D communication. In case of establishing the D2D link between the D2D terminals, the network can assign a physical D2D link identifier (LID) to the established D2D link. The physical D2D link ID can be used as an identifier for identifying each of a plurality of D2D links in case that there are a plurality of the D2D links among a plurality of D2D terminals.

Unlike the network concentrated type and the distributed D2D communication type, according to an autonomous D2D communication type, D2D terminals can freely perform D2D communication without a help of a network. In particular, unlike the network concentrated type and the distributed D2D communication type, an access control, occupation of a radio resource and the like can be autonomously performed by the D2D terminals in the autonomous D2D communication type. If necessary, the network may provide the D2D terminals with D2D channel information capable of being used in a corresponding cell.

Configuration of D2D Communication Link

For clarity, a terminal performing or capable of performing the D2D communication, which is a direct communication between terminals, is called a D2D terminal (D2D terminal). In the following description, a 'UE' may correspond to a D2D terminal. When it is necessary to distinguish a transmitting end from a receiving end, in case of performing the D2D communication, a D2D terminal transmitting or intending to transmit data to a different D2D terminal using a radio resource given to a D2D link is called a transmission D2D terminal. On the contrary, a terminal receiving or intending to receive data from the transmission D2D terminal is called a reception D2D terminal. If there exist a plurality of reception D2D terminals, which receive or intend to receive data from the transmission D2D terminal, a plurality of the reception D2D terminals can be distinguished from each other using a prefix such as 'first to N'. Moreover, for clarity, such a random node of a network as a base station configured to perform access control between D2D terminals or allocate a radio resource to a D2D link, a D2D server, an access/session management server and the like are commonly called a 'network' in the following description.

In order for a D2D terminal performing D2D communication to transmit data to a different D2D terminal via the D2D communication, it is necessary for the D2D to check whether or not D2D terminals capable of transmitting and receiving data are located near the D2D terminal. To this end, the D2D terminal performs D2D peer discovery. The D2D terminal performs D2D discovery within a discovery interval and all D2D terminals may share the discovery interval. The D2D terminal monitors logical channels of a discovery region within the discovery interval to receive D2D discovery signals transmitted by different D2D terminals. Having received the signals of the different D2D terminals, the D2D terminal makes a list of adjacent D2D terminals using the received signal. And, the D2D terminal broadcasts information (i.e., an identifier) of the D2D terminal within the discovery interval and the different D2D terminals receive the broadcasted D2D discovery signal. By doing so, the different D2D terminals are able to know that the D2D terminal exists within a range capable of performing D2D communication.

Information broadcasting for D2D discovery can be periodically performed. And, broadcasting timing can be determined in advance by a protocol and can be notified to D2D terminals. The D2D terminal can transmit/broadcast a signal during a part of the discovery interval. Each of the D2D terminals may monitor signals potentially transmitted by different D2D terminals during the rest of the D2D discovery interval.

For example, a D2D discovery signal may correspond to a beacon signal. And, D2D discovery intervals may include a plurality of symbols (e.g., OFDM symbols). A D2D terminal selects at least one symbol belonging to a D2D discovery interval to transmit/broadcast a D2D discovery signal. And, the D2D terminal may transmit a signal corresponding to a tone of the symbol selected by the D2D terminal.

After the D2D terminals have discovered with each other via the D2D discovery procedure, the D2D terminals can perform an access (connection) establishment procedure. For example, referring to FIG. 1, a first device 102 and a second device 106 can be linked with each other via the access procedure. Subsequently, the first device 102 can transmit traffic to the second device 106 using a D2D link 108. The second device 106 can also transmit traffic to the first device 102 using the D2D link 108.

Figure 11:
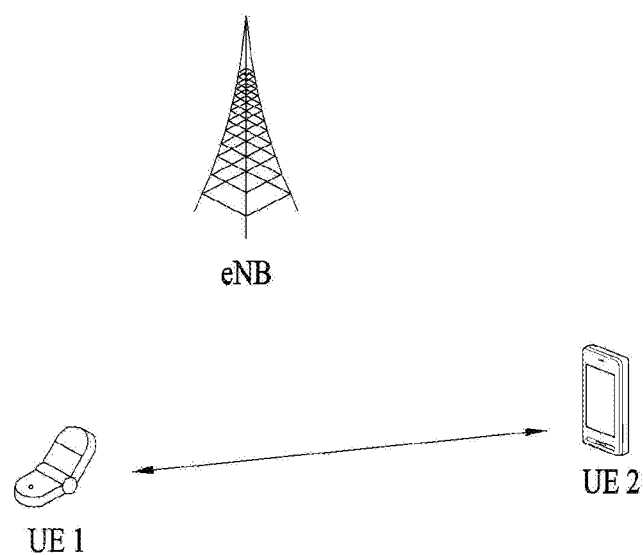
FIG. 11 is a diagram for a simplified D2D communication network.

FIG. 11 is a diagram for a simplified D2D communication network.

Referring to FIG. 11, D2D communication is performed between UEs (UE1 and UE2) supporting D2D communication. In general, a user equipment (UE) corresponds to a terminal of a user. If such a network device as an eNB (evolved Node B) transmits and receives a signal according to a communication scheme between the UEs UE1 and UE2), the eNB can be considered as a UE as well.

A UE1 selects a resource unit corresponding to a specific resource from a resource pool corresponding to a set of resources and the UE1 transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission.

Figure 12:
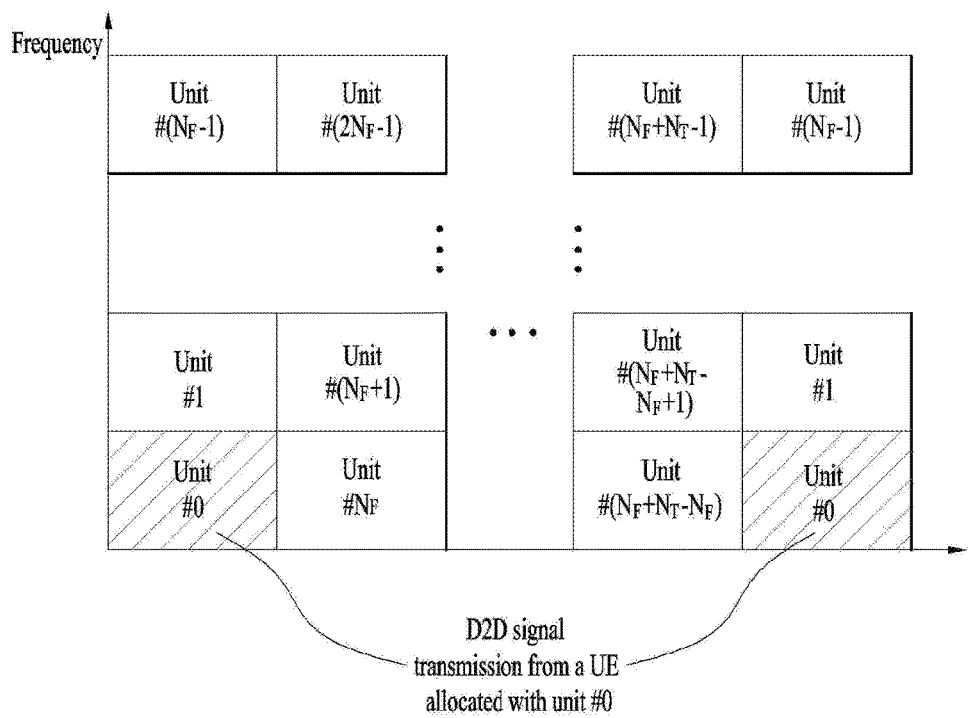
FIG. 12 is a diagram for a configuration of a resource unit according to an example.

FIG. 12 is a diagram for a configuration of a resource unit according to an example.

In FIG. 12, a vertical axis corresponds to a frequency resource and a horizontal axis corresponds to a time resource. A radio resource is divided into the $N_T$ number of resource units in a time axis to configure the $N_T$ number of subframes. And, a frequency resource is divided into the $N_F$ number of resource units in a subframe. In particular, one subframe can include the $N_T$ number of symbols. In particular, it is able to define $N_F*N_T$ number of resource units in total.

A D2D transmission resource (unit #0) allocated to a unit number 0 is repeated in every $N_T$ number of subframes. In embodiment of FIG. 12, a resource pool can be repeated with a period of the $N_T$ number of subframes. As shown in FIG. 12, a specific resource unit may periodically and repeatedly appear. Or, an index of a physical resource unit to which a logical resource unit is mapped may change according to a predetermined pattern to obtain a diversity gain in time domain and/or frequency domain. For example, the logical resource unit can hop on time and/or frequency axis according to a predetermined pattern set to an actual physical resource unit. In FIG. 12, a resource pool may correspond to a set of resource units capable of being used by a UE intending to transmit a D2D signal.

The resource pool can be classified into various types. First of all, the resource pool can be classified according to contents of a D2D signal transmitted via each resource pool. For example, the contents of the D2D signal can be classified into various signals and a separate resource pool can be configured according to each of the contents.

Scheduling assignment (SA): The SA may correspond to a signal including information on a resource position of a D2D data channel, information on MCS (modulation and coding scheme) necessary for modulating and demodulating a data channel, information on a MIMO transmission scheme, and the like. SA information may include an identifier of a target UE to which data of each transmission UE is to be transmitted. A signal including the SA information can be transmitted on an identical resource unit in a manner of being multiplexed with D2D data. In this case, an SA resource pool may correspond to a pool of resources that SA and D2D data are transmitted in a manner of being multiplexed.

D2D data channel: The D2D data channel corresponds to a resource pool used by a transmission UE to transmit user data using a resource designated by the SA. If an SA signal and a D2D data channel are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool.

Discovery message: A discovery message resource pool corresponds to a resource pool for transmitting a discovery message that enables neighboring UEs to discover a transmission UE transmitting information such as ID of the UE, and the like.

As mentioned in the foregoing description, a D2D resource pool can also be classified according to content of a D2D signal. Yet, although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), and the like.

According to the aforementioned contents, a UE intending to transmit data via D2D selects an appropriate resource from an SA pool and transmits SA of the transmission UE. In this case, as a reference for selecting an SA resource pool, it may be able to preferentially select an SA resource interlocked with a resource that satisfies at least one of a resource not transmitting SA of a different UE and a resource which is expected not to transmit data in a following subframe according to SA of a different UE. In addition, the transmission UE may select an SA resource interlocked with a data transmission resource of which an interference level is expected to be low. And, the SA information can be broadcasted. In doing so, UEs belonging to a D2D communication system may receive the broadcasted SA information. In the following, 'transmitting' or 'sending' can be replaced with 'broadcasting'.

Figure 13:
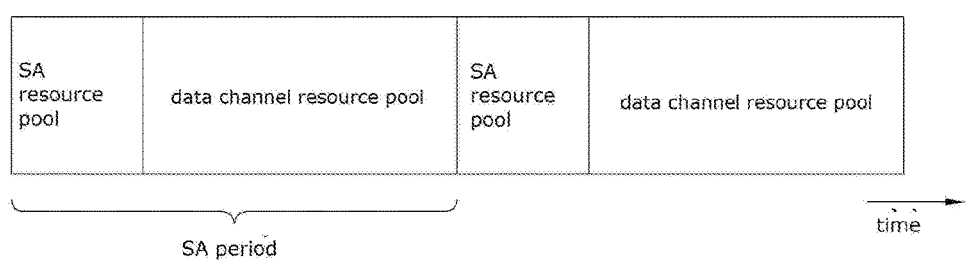
FIG. 13 is a diagram for a periodic SA (scheduling assignment) resource pool according to an example.

FIG. 13 is a diagram for a periodic SA (scheduling assignment) resource pool according to an example.

In general, an SA resource pool is located prior to a D2D data channel resource pool. First of all, a UE attempts to detect SA information. If the UE detects the existence of data necessary to be received by the UE, the UE may attempt to receive the data in a data resource interlocked with the UE. For example, as shown in FIG. 13, a resource pool can consist of an SA resource pool appearing prior to a data channel resource pool and the data channel resource pool. As shown in FIG. 13, the SA resource pool may periodically appear. In the following description, a period at which the SA resource pool appears can be referred to as an SA period.

As mentioned in the foregoing description, when D2D communication is performed, a signal can be transmitted using a legacy uplink resource. In case of performing communication using the uplink resource, it may apply MIMO technique to obtain diversity.

In order to obtain diversity, MIMO technique of two types of MIMO technique can be used. One is a closed loop MIMO technique using a feedback on a channel and another one is an open loop MIMO technique not having a feedback on a channel. In general, since feedback information on a channel state is used, the closed loop MIMO technique is superior to the open loop MIMO technique. Yet, this is enabled only when feedback information on a channel is accurate. If the feedback information on a channel is not accurate, the open loop MIMO technique may be superior to the closed loop MIMO technique.

For example, when D2D communication is performed, many devices may use multiple antennas to secure diversity. In this case, if the closed loop MIMO technique is applied, feedback information for each of the multiple antennas of each device should be exchanged between a transmitting side and a receiving side. As a result, an amount of feedback information can be considerably increased. The increase of the feedback information may reduce an amount of radio resources for transmitting data and cause inefficiency. Hence, it may be preferable to use the open loop MIMO technique.

For example, when D2D communication is performed, a transmitting side or a receiving side may correspond to a vehicle or a communication device mounted on a vehicle. If a vehicle moves fast, a channel state between the transmitting side and the receiving side may change quickly. In particular, if the channel state changes quickly, feedback information on the channel state may be not accurate. In this case, it may be preferable to use the open loop MIMO technique.

The embodiments of the present specification described in the following can be applied not only to D2D communication using an uplink resource but also to general communication using an uplink resource.

In the following, the embodiments are explained on the basis of an STBC (Space-Time Block Codes) scheme corresponding to one of the aforementioned open-loop MIMO schemes. In general, the STBC corresponds to a scheme of configuring space-time resources orthogonal to each other or quasi-orthogonal to each other using non-orthogonal space resources together with a time resource. The STBC assumes time resources having an almost similar channel as the same resource and configures a space resource to be orthogonal or quasi-orthogonal using equality of a channel.

For example, in case of using 2 antennas, it may use Alamouti scheme. According to the Alamouti scheme, a data vector $[x_1\ x_2]^T$ is transmitted in a first time period and a data vector $[-x^*_2\ x^*_1]^T$ can be transmitted in a second time period. In this case, "*" corresponds to a complex conjugate. If it is assumed that one reception antenna is used and a channel of the first time period is identical to a channel of the second time period, a signal received by a receiving end can be represented as equation 14 in the following.

$$y_1 = h_1 x_1 + h_2 x_2 + n_1$$

$$y_2 = -h_1 x^*_2 + h_2 x^*_1 + n_2 \qquad \text{[Equation 14]}$$

In equation 14, $y_1$ corresponds to a signal received in the first time period and $y_2$ corresponds to a signal received in the second time period. And, $n_1$ corresponds to a thermal noise in the first time period and $n_2$ corresponds to a thermal noise in the second time period. And, $h_1$ corresponds to a channel between a first transmission antenna and the reception antenna and $h_2$ corresponds to a channel between a second transmission antenna and the reception antenna. In equation 14, if conjugation is performed on the $y_2$, it can be represented as equation 15 in the following.

$$\begin{bmatrix} y_1 \\ y_2^* \end{bmatrix} = \begin{bmatrix} h_1 & h_2 \\ h_2^* & -h_1^* \end{bmatrix} \begin{bmatrix} x_1 \\ x_2 \end{bmatrix} + \begin{bmatrix} n_1 \\ n_2^* \end{bmatrix} \qquad \text{[Equation 15]}$$

As shown in equation 15, space resources become orthogonal to each other via the Alamouti scheme. And, it may be able to obtain diversity as much as twice compared to a case of transmitting a data vector $[x_1\ x_2]^T$ in both the first time period and the second time period.

Meanwhile, if a receiving end receives a radio signal, the receiving end generally performs AGC (Automatic Gain Control) in response to the received radio signal. When the signal is processed in a signal circuit, if the AGC is performed, it may be able to prevent input signal versus output signal from being distorted. In case of performing D2D communication, since a distance between UEs is different, signal power received by each UE is different. Hence, the AGC for preventing distortion of a reception signal is more important in performing D2D communication.

Meanwhile, if the STBC scheme is applied in a manner of binding a first OFDM symbol and a second OFDM symbol (e.g., OFDM symbol indexes 0 and 1) together, a problem may occur. For example, if a receiving end fails to receive the first OFDM symbol, the receiving end should receive rank-2 signaling using the second symbol only. In order to prevent the abovementioned situation, a communication system (e.g., D2D communication system) using an uplink resource can define an STBC structure to be started from the second OFDM symbol except the first OFDM symbol.

For more specific explanation, data mapping in the STBC scheme is explained. In order to use the STBC scheme, it is necessary for a receiving end to measure reference signals transmitted from at least two or more ports. For example, in case of using the Alamouti scheme, reference signals of at least two ports are assumed. In case of using quasi-orthogonal STBC, it may assume reference signals of 4 ports. In the following, the reference signal can be assumed as a DMRS (De-Modulation Reference Signal).

In order to perform data mapping, according to the Alamouti scheme, it may consider a transmission signal shown in equation 16 in the following.

$$[y(i)\ y(i+1)] = \frac{1}{\sqrt{N_t}} \times \begin{bmatrix} x_1 & -x_2^* \\ x_2 & x_1^* \end{bmatrix} \qquad \text{[Equation 16]}$$

In equation 16, $y(i)$ and $y(i+1)$ correspond to transmission signal vectors transmitted in resource elements (REs) different from each other. In the $y(i)$, a transmitting end and a receiving end may assume that a signal $x_1$ is transmitted from a DMRS port 0 and a signal $x_2$ is transmitted from a DMRS port 1. In the $y(i+1)$, a transmitting end and a receiving end may assume that a signal $-x_2^*$ is transmitted from a DMRS port 0 and a signal $x_1^*$ is transmitted from a DMRS port 1. In this case, $N_t$ corresponds to the number of transmission antennas.

In equation 16, i and i+1 can be assumed as channels adjacent to each other. For example, if there is frequency adjacency, the i corresponds to frequency indexes 0, 2, 4, 6, 8, and 10 and the i+1 may correspond to frequency indexes 1, 3, 5, 7, 9, and 11.

Meanwhile, for example, i and i+1 can be assumed as channels adjacent to each other in time. And, as mentioned in the foregoing description, the STBC structure may not be applied to the first OFDM symbol for the AGC.

Figure 14:
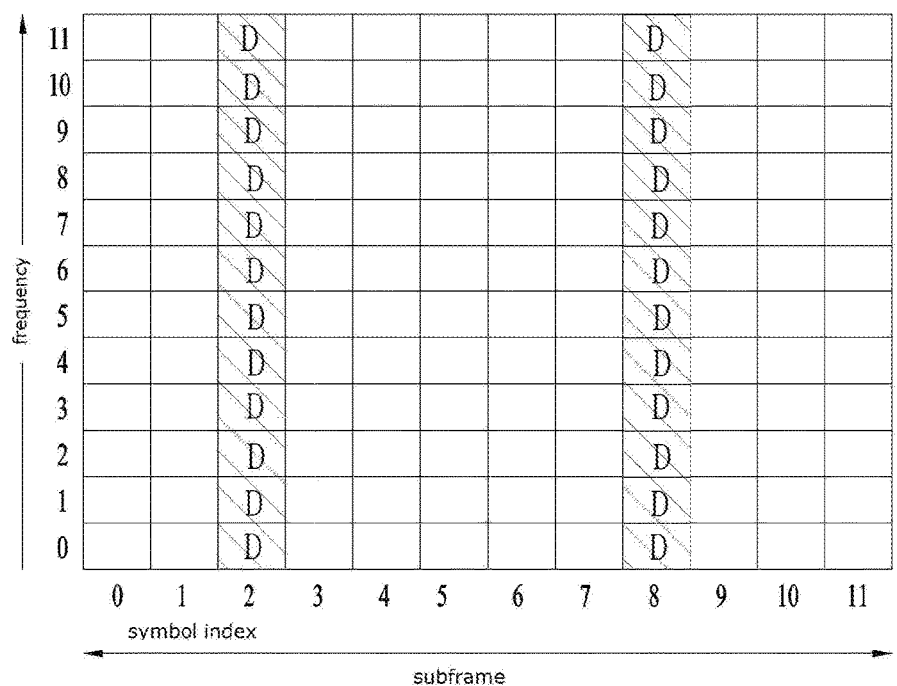
FIG. 14 is a diagram for arrangement of a reference signal according to one embodiment of the present invention.

FIG. 14 is a diagram for arrangement of a reference signal according to one embodiment of the present invention.

As shown in FIG. 14, the present invention is explained on the basis of a subframe used in a current extended CP. Referring to FIG. 14, resource elements represented by "D" correspond to resource elements in which a DMRS is transmitted. As shown in FIG. 14, in case of an extended CP, a DMRS can be transmitted in OFDM symbol indexes 2 and 8. If the aforementioned STBC scheme is applied, $y(i)$ and $y(i+1)$ can be transmitted in two OFDM symbols adjacent to each other except a first OFDM symbol (OFDM symbol index 0). For example, if the OFDM symbol index 1 is used for $y(i)$, since a DMRS is transmitted in the OFDM symbol index 2, an OFDM symbol index 3 can be assumed as an adjacent OFDM symbol. In particular, in FIG. 14, the OFDM symbol indexes 1 and 3 are assumed as channels adjacent to each other. In particular, if an OFDM symbol, which is adjacent to an OFDM symbol used by $y(i)$ in time domain, is used for a DMRS, an OFDM symbol appearing after the OFDM symbol used for the DMRS can be assumed as an OFDM symbol for $y(i+1)$. The aforementioned assumption can be shared between a transmitting end and a receiving end.

Yet, as mentioned in the foregoing description, if a single OFDM symbol exists between the $y(i)$ and the $y(i+1)$ due to the DMRS, a channel may somewhat change due to the time interval. The change of the channel may cause performance degradation of the STBC. In order to prevent the performance degradation, it may change a position of a DMRS. For example, in order to transmit the $y(i)$ and the $y(i+1)$ in the OFDM symbol indexes 1 and 2, it may be able to change a DMRS of the current OFDM symbol index 2 to be transmitted in an OFDM symbol index 1 or an OFDM symbol index 5. In particular, it may be able to arrange a DMRS to make an STBC pair to be allocated to contiguous OFDM symbols in time domain. For example, if a DMRS is transmitted in a first OFDM symbol, y(i), y(i+1), y(i+2), and y(i+3) can be transmitted in OFDM symbol indexes 2, 3, 4, and 5, respectively.

When data is mapped according to the STBC scheme, assume that y(i) and y(i+1) are adjacent to each other in time domain. For example, the number of OFDM symbols for transmitting data may corresponds to an odd number. For example, assume that 2 antenna ports are used. In case of an extended CP shown in FIG. 14, 12 OFDM symbols exist in a subframe. Among the 12 OFDM symbols, 2 OFDM symbols are used for a DMRS and an STBC structure is not applied to a first OFDM symbol (OFDM symbol index 0). Hence, if the STBC scheme is applied, in case of an extended CP, 9 OFDM symbols can be used for transmitting data except the first OFDM symbol and the 2 OFDM symbols used for the DMRS. As a result, since the odd number of OFDM symbols is remaining, the STBC may not be applied to 1 OFDM symbol. Hence, a DMRS can be transmitted one more time in the OFDM symbol to which the STBC is not applicable. For example, 3 OFDM symbols can be used to transmit a DMRS.

As mentioned in the foregoing description, if the odd number of OFDM symbols are used to transmit a DMRS, each of the OFDM symbols used for transmitting the DMRS can be used to transmit 1 antenna port (DMRS port) only. For example, when 3 OFDM symbols are used to transmit a DMRS, 2 OFDM symbols can be used to transmit a DMRS port 0 and 1 OFDM symbol can be used to transmit a DMRS port 1. In particular, since one OFDM symbol transmits one DMRS port only, it is not necessary to distinguish one port from another by an OCC (orthogonal cover code) in a symbol. Hence, in this case, it may not use the OCC.

Meanwhile, when a quasi-orthogonal scheme is used, it may consider data mapping of a transmission signal according to equation 17 described in the following.

$$[y(i)y(i+1)y(i+2)y(i+3)] = \frac{1}{\sqrt{N_t}} \times \begin{bmatrix} x_1 & -x_2^* & -x_3^* & x_4 \\ x_2 & x_1^* & -x_4^* & -x_3 \\ x_3 & -x_4^* & x_1^* & -x_2 \\ x_4 & x_3^* & x_2^* & x_1 \end{bmatrix} \quad \text{[Equation 17]}$$

In equation 17, assume that a resource element in which signal vectors y(i) and y(i+1) are transmitted is different from a resource element in which signal vectors y(i+2) and y(i+3) are transmitted. In the y(i), a signal $x_1$ is transmitted in a DMRS port 0, a signal $x_2$ is transmitted in a DMRS port 1, a signal $x_3$ is transmitted in a DMRS port 2, and a signal $x_4$ is transmitted in a DMRS port 3. In the y(i+1), a signal $-x_2^*$ is transmitted in a DMRS port 0, a signal $x_1^*$ is transmitted in a DMRS port 1, a signal $-x_4^*$ is transmitted in a DMRS port 2, and a signal $x_3^*$ is transmitted in a DMRS port 3. In the y(i+2), a signal $-x_3^*$ is transmitted in a DMRS port 0, a signal $-x_4^*$ is transmitted in a DMRS port 1, a signal $x_1^*$ is transmitted in a DMRS port 2, and a signal $x_2^*$ is transmitted in a DMRS port 3. In the y(i+3), a signal $x_4$ is transmitted in a DMRS port 0, a signal $-x_3$ is transmitted in a DMRS port 1, a signal $-x_2$ is transmitted in a DMRS port 2, and a signal $x_1$ is transmitted in a DMRS port 3. And, a sequence of the signal transmission can be configured in advance between a transmitting end and a receiving end. Or, the transmitting end may inform the receiving end of the sequence.

In equation 17, i, i+1, i+2, and i+3 can be assumed as channels adjacent to each other in time domain. For example, the channels can be assumed as channels adjacent to each other in frequency domain. In this case, referring to FIG. 14, the i corresponds to frequency indexes 0, 4, and 8, the i+1 corresponds to frequency indexes 1, 5, and 9, the i+2 corresponds to frequency indexes 2, 6, and 10, and the i+3 corresponds to frequency indexes 3, 7, and 11.

In equation 17, i, i+1, i+2, and i+3 can be assumed as channels adjacent to each other in time domain. And, an STBC structure may not be applied to the first OFDM symbol for AGC. In this case, referring to FIG. 14, since a DMRS is transmitted in an OFDM symbol having an OFDM symbol index 2, OFDM symbols 1 and 3 are assumed as channels adjacent to each other. In particular, if a symbol adjacent to the i (or, i+1 or i+2) is used to transmit a DMRS in time domain, a transmitting end and a receiving end may assume that an OFDM symbol immediately after the DMRS corresponds to the i+1 (or, i+2 or i+3).

As mentioned in the foregoing description, if adjacency is assumed between symbols except OFDM symbols for transmitting a DMRS, referring to FIG. 14, a gap as much as one OFDM symbol occurs between an OFDM symbol 1 and an OFDM symbol 3. In this case, since the STBC is originated from the similarity of contiguous channels in time, a change may occur on a channel due to the gap between OFDM symbols and it may cause overall performance degradation. In order to prevent the problem, in FIG. 14, it may be able to configure a DMRS transmitted in an OFDM symbol index 2 to be transmitted in an OFDM symbol index 1 or an OFDM symbol index 5. In particular, a DMRS can be arranged to make an STBC pair to be allocated to contiguous OFDM symbols in time domain. For example, a DMRS can be transmitted in a first OFDM symbol instead of a second OFDM symbol. As mentioned in the foregoing description, the STBC is not applied to $0^{th}$ OFDM symbol for AGC. In this case, y(i), y(i+1), y(i+2), and y(i+3) can be transmitted in OFDM symbol 2, 3, 4, and 5, respectively.

According to the aforementioned embodiments, the STBC scheme is not applied to the first OFDM symbol (e.g., OFDM symbol index 0) in consideration of the AGC. In this case, in order not to waste the first OFDM symbol to which the STBC scheme is not applied, it may use the first OFDM symbol for a different usage. According to the following embodiment, the STBC scheme is not applied to the first OFDM symbol and the first OFDM symbol is used for a different usage.

As a method of efficiently performing the AGC, a predetermined signal known to a receiving end can be transmitted in the first OFDM symbol. The receiving end performs the AGC using the first OFDM symbol. If the receiving end knows a signal to be received in the first symbol, it may be able to more efficiently perform the AGC. The receiving end is able to know power information for the AGC using a previously known signal of the first OFDM symbol and the receiving end can perform gain control on following OFDM symbols using the power information.

Figure 15:
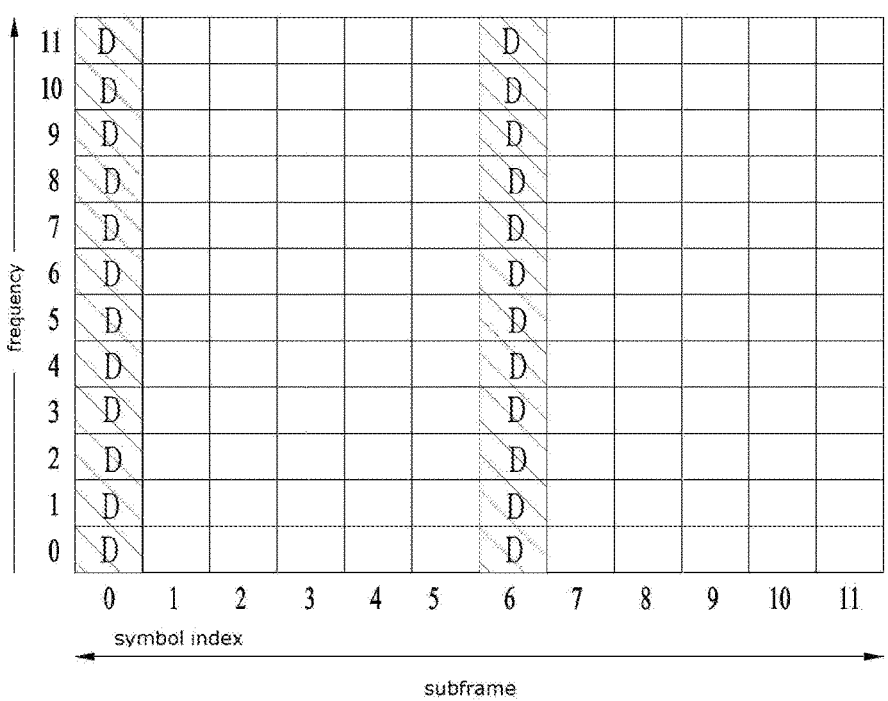
FIG. 15 is a diagram for arrangement of a reference signal according to a different embodiment of the present invention.

FIG. 15 is a diagram for arrangement of a reference signal according to a different embodiment of the present invention.

For example, a predetermined signal transmitted in the first OFDM symbol may correspond to a DMRS. If the DMRS is transmitted in the first OFDM symbol for an extended CP, the DMRS can be assigned as FIG. 15. In FIG. 15, resource elements represented by "D" correspond to resource elements used by the DMRS.

For example, it may transmit data in a different form rather than the STBC structure in the first OFDM symbol. For example, it may transmit data using a single antenna only in the first OFDM symbol. And, it may perform transmission by sequentially changing a different antenna according to a subcarrier in the first OFDM symbol. For example, in case of using 2 antennas, a subcarrier having an even-numbered frequency index of the first OFDM symbol is used by a first antenna and a subcarrier having an odd-numbered frequency index of the first OFDM symbol is used by a second antenna.

And, an eNB can inform a UE of information on whether to apply the STBC scheme, a detail STBC scheme, and/or a position of a DMRS through higher layer signaling (e.g., RRC (Radio Resource Control) signaling). In case of performing D2D communication, it may be able to configure out of coverage UEs to use the STBC scheme all the time or configure the out of coverage UEs not to use the STBC scheme all the time.

In order to dynamically apply the STBC scheme, it may signal information on the STBC scheme. For example, it may inform a transmitting end and/or a receiving end of information on whether to apply the STBC scheme, a detail STBC scheme, and/or a position of a DMRS through DCI (Downlink Control Information) and/or SA (Scheduling Assignment) (e.g., PSCCH (Physical Sidelink Control Channel).

For example, information on an STBC scheme to be applied among various types of STBC schemes can be signaled as information on the aforementioned STBC scheme. And, information on an STBC data mapping method to be applied among various types of STBC data mapping methods can be signaled as well together with the information on the aforementioned STBC scheme. For example, it may inform a UE of information on a scheme to be applied among the Alamouti scheme and the quasi-orthogonal scheme.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

Although a method of supporting a MIMO technique for uplink and an apparatus therefor are explained centering on the example applied to 3GPP LTE system, the method and the apparatus can also be applied to various wireless communication systems besides the 3GPP LTE system.

What is claimed is:

1. A method of transmitting a signal by a first user equipment (UE) in a wireless communication system supporting multi-antenna, the method comprising:
    mapping, by the first UE, first demodulation reference signals (DMRSs) for a first antenna port to a first Orthogonal Frequency Division Multiplexing (OFDM) symbol having a lowest OFDM symbol index in a subframe, wherein the first OFDM symbol is used for Automatic Gain Control (AGC);
    mapping, by the first UE, second DMRSs for a second antenna port to a second OFDM symbol different from the first OFDM symbol;
    mapping, by the first UE, data received from a plurality of antenna ports to one or more OFDM symbols of the subframe other than the first and second OFDM symbols according to Drill a Space-Time Block Code (STBC) scheme; and
    transmitting, by the first UE to a second UE, the subframe using a resource allocated for uplink,
    wherein, when the one or more OFDM symbols is an odd number of symbols, the second DMRSs for the second antenna port are additionally mapped to a third OFDM symbol among the one or more OFDM symbols, and
    wherein the first and second antenna ports are included in the plurality of antenna ports.

2. The method of claim 1, wherein the step of mapping the data received from the plurality of antenna ports comprises the step of alternately mapping data received from the first antenna port and data received from the second antenna port to the one or more OFDM symbols.

3. The method of claim 2, wherein when an extended cyclic prefix is used, an index of the second OFDM symbol is 3 and an index of the third OFDM symbol is 8.

4. The method of claim 1, wherein the data received from each of the plurality of the antenna ports is sequentially mapped to the one or more OFDM symbols according to a subcarrier.

5. A method of receiving a signal by a first user equipment (UE) in a wireless communication system supporting multi-antenna, the method comprising:
    receiving, by the first UE from a second UE, a subframe using a resource allocated for uplink; and
    performing, by the first UE, Automatic Gain Control (AGC) using a first Orthogonal Frequency Division Multiplexing (OFDM) symbol having a lowest OFDM symbol index in the subframe,
    wherein first demodulation reference signals (DMRSs) for a first antenna port are mapped to the first OFDM symbol,
    wherein second DMRSs for a second antenna port are mapped to a second OFDM symbol different from the first OFDM symbol,
    wherein data received from a plurality of antenna ports are mapped to one or more OFDM symbols of the subframe other than the first and second OFDM symbols according to a Space-Time Block Code (STBC) scheme, wherein, when the one or more OFDM symbols is an odd number of symbols, the second DMRSs for the second antenna port are additionally mapped to a third OFDM symbol among the one or more OFDM symbols, and wherein the first and second antenna ports are included in the plurality of antenna ports.

6. The method of claim 5, wherein the data received from the plurality of antenna ports correspond to data received from the first antenna port and data received from the second antenna port, which are alternately mapped to the one or more OFDM symbols.

7. The method of claim 6, wherein when an extended cyclic prefix is used, an index of the second OFDM symbol is 3 and an index of the third OFDM symbol is 8.

8. The method of claim 5, wherein the data received from each of the plurality of the antenna ports is sequentially mapped to the one or more OFDM symbols according to a subcarrier.

9. A user equipment (UE) in a wireless communication system supporting multi-antenna, the UE comprising:
a transmitter; and
a processor, operatively coupled to the transmitter,
wherein the processor:
maps first demodulation reference signals (DMRSs) for a first antenna port to a first Orthogonal Frequency Division Multiplexing (OFDM) symbol having a lowest OFDM symbol index in a subframe, wherein the first OFDM symbol is used for Automatic Gain Control (AGC),
maps second DMRSs for a second antenna port to a second OFDM symbol different from the first OFDM symbol,
maps data received from a plurality of antenna ports to one or more OFDM symbols of the subframe other than the first and second OFDM symbols according to a Space-Time Block Code (STBC) scheme,
controls the transmitter to transmit the subframe using a resource allocated for uplink, wherein, when the one or more OFDM symbols is an odd number of symbols, the second DMRSs for the second antenna port are additionally mapped to a third OFDM symbol among the one or more OFDM symbols, and wherein the first and second antenna ports are included in the plurality of antenna ports.

10. A user equipment (UE) in a wireless communication system supporting multi-antenna, the UE comprising:
a receiver; and
a processor, operatively coupled to the receiver,
wherein the processor:
receive a subframe using a resource allocated to uplink,
performs Automatic Gain Control (AGC) using a first Orthogonal Frequency Division Multiplexing (OFDM) symbol having a lowest OFDM symbol index in the subframe,
wherein first demodulation reference signals (DMRSs) for a first antenna port are mapped to the first OFDM symbol, and
wherein second DMRSs for a second antenna port are mapped to a second OFDM symbol different from the first OFDM symbol,
wherein data received from a plurality of antenna ports are mapped to one or more OFDM symbols of the subframe other than the first and second OFDM symbols according to a Space-Time Block Code (STBC) scheme,
wherein, when the one or more OFDM symbols is an odd number of symbols, the second DMRSs for the second antenna port are additionally mapped to a third OFDM symbol among the one or more OFDM symbols, and
wherein the first and second antenna ports are included in the plurality of antenna ports.

* * * * *